US011291938B2

(12) United States Patent
Padovan et al.

(10) Patent No.: US 11,291,938 B2
(45) Date of Patent: Apr. 5, 2022

(54) COANDA EFFECT MOISTURE SEPARATOR SYSTEM

(71) Applicant: General Electric Technology GmbH, Baden (CH)

(72) Inventors: Loris Padovan, Baden (CH); Praveen Kumar Garlapati, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 520 days.

(21) Appl. No.: 15/382,146

(22) Filed: Dec. 16, 2016

(65) Prior Publication Data

US 2018/0169554 A1  Jun. 21, 2018

(51) Int. Cl.
| B01D 45/00 | (2006.01) |
| B01D 45/08 | (2006.01) |
| B01D 45/16 | (2006.01) |
| F01K 7/22  | (2006.01) |
| F22B 37/26 | (2006.01) |
| F22B 37/30 | (2006.01) |
| F22B 37/28 | (2006.01) |

(52) U.S. Cl.
CPC ............. B01D 45/08 (2013.01); B01D 45/16 (2013.01); F01K 7/223 (2013.01); F22B 37/26 (2013.01); F22B 37/28 (2013.01); F22B 37/30 (2013.01)

(58) Field of Classification Search
CPC .............. F01K 7/223; B01D 45/04–10; B01D 45/00–16; F16T 1/00–48; F22B 37/26–327
USPC ...................... 137/171–204; 95/267; 122/492
See application file for complete search history.

(56) References Cited

U.S. PATENT DOCUMENTS

| 3,766,719 | A |   | 10/1973 | McAnally |
| 3,945,920 | A |   | 3/1976 | Paszyc |
| 4,014,671 | A | * | 3/1977 | Andro ..................... B01D 46/12 55/325 |
| 4,289,514 | A |   | 9/1981 | Carter et al. |
| 4,602,925 | A |   | 7/1986 | Huffman |
| 4,673,426 | A |   | 1/1987 | Silvestri |
| 4,738,585 | A |   | 4/1988 | von Bockh |
| 4,825,653 | A | * | 5/1989 | Silvestri, Jr. ............. F22B 37/28 55/392 |
| 7,896,937 | B2 |   | 3/2011 | Miemiec |
| 2002/0020296 | A1 | * | 2/2002 | Illingworth ............... A47L 9/08 95/270 |

(Continued)

FOREIGN PATENT DOCUMENTS

| EP | 0 233 332 A1 | 8/1987 |
| EP | 1 990 806 A1 | 11/2008 |

OTHER PUBLICATIONS

International Search Report and Written Opinion issued in connection with corresponding PCT Application No. PCT/EP2017/081256 dated Apr. 13, 2018.

*Primary Examiner* — T. Bennett McKenzie
(74) *Attorney, Agent, or Firm* — Eversheds Sutherland (US) LLP

(57) ABSTRACT

The present application provides a pre-separator for use with a flow of steam entering a moisture separator reheater. The pre-separator may include a neck, an internal baffle, a wall, a first pathway defined between the neck and the internal baffle, and a second pathway defined between the internal baffle and the wall. The first pathway and the second pathway create a Coanda effect for the flow of steam entering the moisture separator reheater.

13 Claims, 2 Drawing Sheets

(56) References Cited

U.S. PATENT DOCUMENTS

| | | |
|---|---|---|
| 2011/0005471 A1 | 1/2011 | Fujita |
| 2013/0028366 A1* | 1/2013 | Ikeda .................... B01D 45/16 376/371 |
| 2013/0129498 A1 | 5/2013 | Hofmann |
| 2013/0333386 A1 | 12/2013 | Kluge |
| 2014/0360708 A1 | 12/2014 | Padovan |
| 2016/0175750 A1 | 6/2016 | Padovan |

* cited by examiner

COANDA EFFECT MOISTURE SEPARATOR SYSTEM

TECHNICAL FIELD

The present application and the resultant patent relate generally to turbomachinery and more particularly relate to a pre-separator for a moisture separator reheater using a Coanda effect moisture separator system to remove liquid droplets from a gas or a stream path.

BACKGROUND OF THE INVENTION

Nuclear power plants often include a moisture separator reheater to dry and reheat the steam supply. The moisture separator reheater may dry and reheat the flow of steam exhausted from a steam turbine system that drives, for example, an electrical generator and the like. Specifically, the moisture separator reheater may dry and reheat the steam exhausted from a high pressure steam turbine and then deliver the dry reheated steam to a low pressure steam turbine. As compared to the energy required to evaporate the liquid droplets in the flow of steam, physically removing the liquid droplets provides an overall increase in system efficiency. Moreover, physically removing the liquid droplets may protect downstream equipment from damage due to erosion and the like.

SUMMARY OF THE INVENTION

The present application and the resultant patent thus provide a pre-separator for use with a flow of steam entering a moisture separator reheater. The pre-separator may include a neck, an internal baffle, a wall, a first pathway defined between the neck and the internal baffle, and a second pathway defined between the internal baffle and the wall. The first pathway and the second pathway create a Coanda effect for the flow of steam entering the moisture separator reheater for increased moisture removal efficiency.

The present application and the resultant patent further provide a method of removing moisture in a flow of steam entering a moisture separator reheater. The method may include the steps of flowing the steam into a pre-separator, splitting the flow of steam into a number of pathways, wherein the number of pathways include a substantially curved shape, turning the number of flows of steam approximately ninety degrees, creating a Coanda effect while turning the flows of steam, and substantially attaching the flows of steam to a bottom wall of the moisture separator reheater for increased moisture removal efficiency.

The present application and the resultant patent further provide a moisture separator reheater for removing moisture droplets from a flow of steam. The moisture separator reheater may include a bottom wall and a pre-separator positioned about the bottom wall. The pre-separator may include a first pathway and a second pathway with a substantially curved shape so as to induce a Coanda effect in the flow of steam such that the Coanda effect substantially attaches the flow of steam to the bottom wall for increased moisture removal efficiency.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
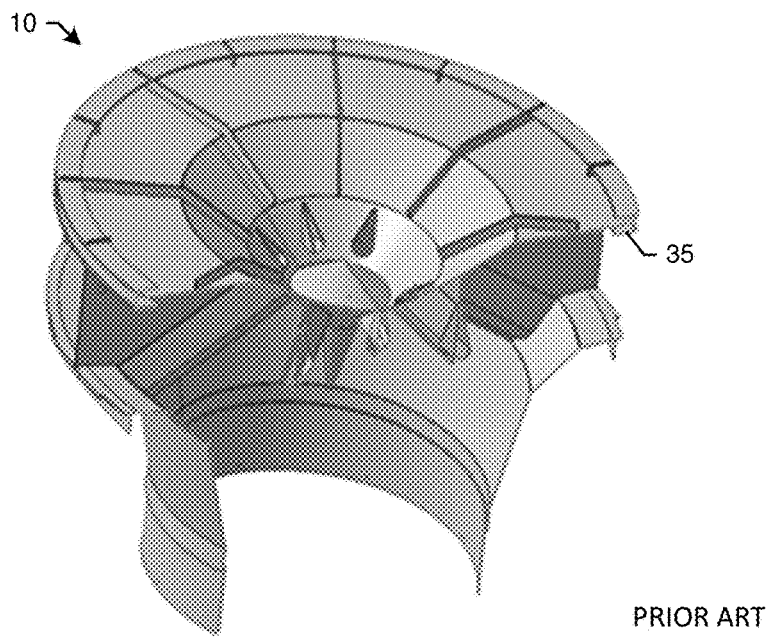
FIG. 1 is a partial perspective view of a pre-separator used with a moisture separator reheater.
Figure 2:
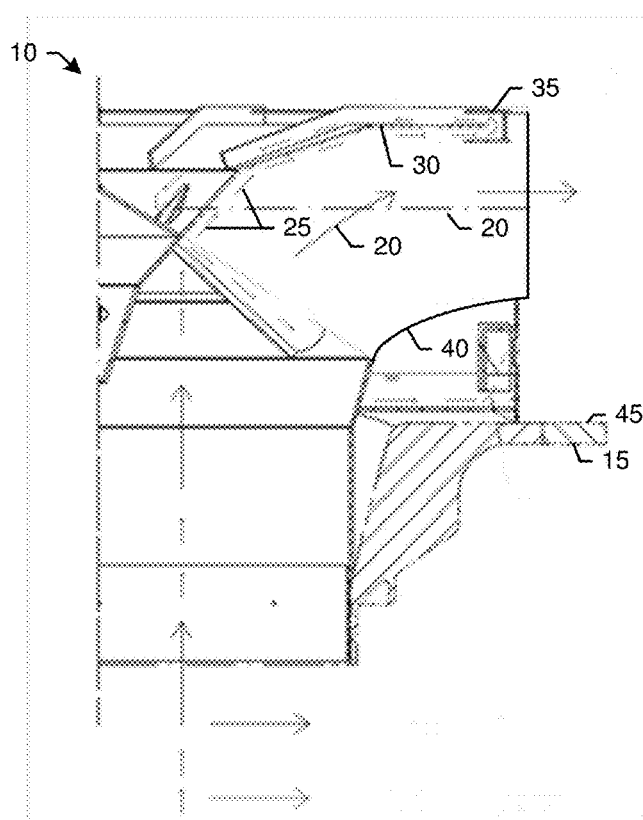
FIG. 2 is a partial sectional view of the pre-separator of FIG. 1.

FIGS. 1 and 2 show portions of a pre-separator 10 that may be used with a moisture separator reheater 15 and the like. Generally described, a flow of wet steam 20 coming from, for example, a high pressure steam turbine, may be introduced into the moisture separator reheater 15 via the pre-separator 10. The flow of steam 20 with moisture droplets 25 therein may enter the pre-separator 10 in a first direction and then may be forced to turn approximately ninety degrees (90°) or so into a largely perpendicular second direction. Due to the inertia of the moisture droplets 25, the moisture droplets 25 may not able to follow this change of direction and thus may deviate from the flow of steam 20 and impact on the walls/ceilings 30 of the pre-separator 10. The moisture droplets 25 may adhere and coalesce along the walls/ceiling 30 and may be captured by a water collector 35 positioned about the circumference of the pre-separator 10. The water collector 35 may be a mechanical device positioned about the pre-separator 10. The moisture droplets 25 then may be drained out of the pre-separator 10 via one or more drains.

The sharp ninety degree (90°) turn may generate a flow separation about a neck 40 of the pre-separator 10. Such a flow separation may create a steam maldistribution in the moisture separator reheater 15. The maldistribution may have an impact on overall moisture removal and reheating efficiency. The moisture separator reheater 15 and the pre-separator 10 described herein are for the purpose of example only. Many other types of moisture separator reheaters 15, pre-separators 10, and components thereof may be known.

Figure 5:
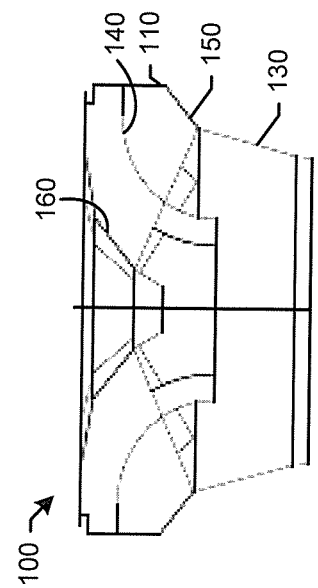
FIG. 5 is a partial sectional view of the pre-separator of FIG. 3.
Figure 3:
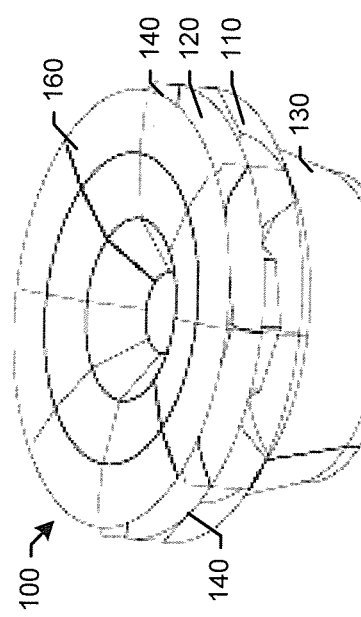
FIG. 3 is a perspective view of a pre-separator as may be described herein for use with a moisture separator reheater.
Figure 4:
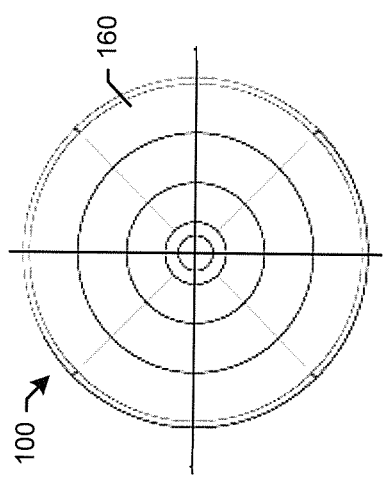
FIG. 4 is a top plan view of the pre-separator of FIG. 3.

FIGS. 3-5 show a pre-separator 100 as may be described herein. The pre-separator 100 may be used with a moisture separator reheater 15 and the like. Instead of a single pathway extended through the pre-separator 10 as described above between the walls/ceiling 30 and the neck 40, the pre-separator 100 described herein may have a first pathway 110 and a second pathway 120. The first pathway 110 may extend from a neck 130 to an internal baffle 140. The internal baffle 140 may have a substantially curved shape 150. The second pathway 120 may extend from the internal baffle 140 to a wall/ceiling 160. The wall/ceiling 160 also may have the substantially curved shape 150. The neck 130, the internal baffle 140, and the wall/ceiling 160 may have any suitable size, shape, or configuration. Although only two pathways are shown the pre-separator 100 may use any number herein. Other components and other configurations may be used herein.

Figure 6:
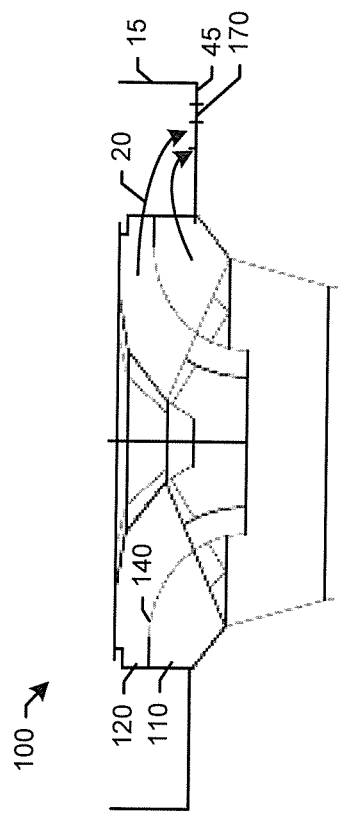
FIG. 6 is a partial sectional view of the pre-separator of FIG. 3 used with a moisture separator reheater.

By splitting the steam path into the first pathway 110 and the second pathway 120, the pre-separator 100 may enable a Coanda effect therethrough. Specifically, the Coanda effect uses the tendency of a fluid jet to attach itself to, and flow along, a wall or another surface. As is shown in FIG. 6, the convex curvature of the pathways 110, 120 deflects the flow such that the flow may attach to a bottom wall 45 of the moisture separator reheater 15 more rapidly and also may be accelerated more rapidly. The Coanda effect largely may avoid the flow separation described above about the neck 40. Rather, the substantially curved shape 150 of the pathways 110, 120 induces the flow of steam 20 with the moisture droplet 25 therein to remain attached to the bottom wall 45 of the moisture separator reheater 15. The flow also slows down because the flow is being distributed in a larger area. This process helps the agglomeration and coalescence of the moisture droplets 25. The moisture droplets consequently become bigger and heavier and, hence, easier to capture via gravity. The moisture droplets 25 thus may be directed towards the bottom wall 45 so as to form a water film. One or more drains 170 may be positioned about the bottom wall 45 to drain the water film or otherwise drain the moisture therein. The resultant flow of steam 20 thus may be significantly drier with the moisture droplets 25 removed. Other components and other configurations may be used herein.

The pre-separator 100 thus promotes a more uniform steam flow distribution 20 therethrough so as to avoid local high residual moisture concentrations upstream of another separator device placed after the pre-separator and higher thermal stresses on the bundles. Moreover, the use of the pre-separator 100 avoids the use of the complex water collectors 35 as described above. The pre-separator 100 may be lighter, more compact, and easy to manufacture. The pre-separator 100 may reduce considerably the pressure loss.

It should be apparent that the foregoing relates only to certain embodiments of the present application and the resultant patent. Numerous changes and modifications may be made herein by one of skill in the art without departing from the spirit and general scope of the invention as defined by the following claims and the equivalents thereof.

We claim:

1. A pre-separator for use with a flow of steam entering a moisture separator reheater, comprising:
   a neck;
   an internal baffle;
   a wall;
   a first pathway defined between the neck and the internal baffle;
   the first pathway extending from a first inlet to a first outlet; and
   a second pathway defined between the internal baffle and the wall;
   the second pathway extending from a second inlet to a second outlet;
   wherein the first pathway and the second pathway create a Coanda effect for the flow of steam by turning the flow of steam substantially ninety degrees and only once between the first and second inlets and the first and second outlets before entering the moisture separator reheater.

2. The pre-separator of claim 1, wherein the first pathway comprises a substantially curved shape.

3. The pre-separator of claim 2, wherein the second pathway comprises a substantially curved shape.

4. The pre-separator of claim 1, wherein the pre-separator is positioned about a bottom wall of the moisture separator reheater and wherein the Coanda effect substantially attaches the flow of steam to the bottom wall.

5. The pre-separator of claim 4, wherein the bottom wall comprises one or more drains therein.

6. The pre-separator of claim 1, wherein the Coanda effect produced by the first pathway and the second pathway promotes a uniform distribution of the flow of steam.

7. The pre-separator of claim 1, wherein the Coanda effect produced by the first pathway and the second pathway promotes coalescence of moisture droplets in the flow of steam.

8. The pre-separator of claim 1, wherein the Coanda effect produced by the first pathway and the second pathway avoids a flow separation of the flow of steam about the neck.

9. The pre-separator of claim 1, wherein the Coanda effect produced by the first pathway and the second pathway slows the flow of steam.

10. The pre-separator of claim 1, wherein the first pathway is unobstructed from the first inlet to the first outlet.

11. The pre-separator of claim 1, wherein the second pathway is unobstructed from the second inlet to the second outlet.

12. The pre-separator of claim 1, wherein the first outlet is unobstructed.

13. The pre-separator of claim 1, wherein the second outlet is unobstructed.

* * * * *